US011946614B2

(12) United States Patent
Chen et al.

(10) Patent No.: US 11,946,614 B2
(45) **Date of Patent: *Apr. 2, 2024**

(54) DOWNLIGHT APPARATUS WITH ANGULARLY ADJUSTABLE LIGHT SOURCE AND SUPPORT

(71) Applicant: XIAMEN ECO LIGHTING CO. LTD., Xiamen (CN)

(72) Inventors: Jinfu Chen, Xiamen (CN); Zhenyu Tang, Xiamen (CN); Shuxing Gao, Xiamen (CN); Yongzhe Dong, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,715

(22) Filed: Nov. 8, 2022

(65) Prior Publication Data

US 2023/0080712 A1 Mar. 16, 2023

Related U.S. Application Data

(63) Continuation of application No. 17/463,808, filed on Sep. 1, 2021, now Pat. No. 11,536,423.

(30) Foreign Application Priority Data

Sep. 1, 2020 (CN) ......................... 202021878130.2

(51) Int. Cl.

| | |
|---|---|
| ***F21V 21/04*** | (2006.01) |
| ***F21S 8/02*** | (2006.01) |
| ***F21V 23/00*** | (2015.01) |
| ***F21V 23/04*** | (2006.01) |
| ***F21V 23/06*** | (2006.01) |

(Continued)

(52) U.S. Cl.

CPC ............ *F21S 8/026* (2013.01); *F21V 21/047* (2013.01); *F21V 23/007* (2013.01); *F21V 23/04* (2013.01); *F21V 23/06* (2013.01); *F21V 29/70* (2015.01); *F21Y 2115/10* (2016.08)

(58) Field of Classification Search

CPC .... F21V 21/047; F21V 21/049; F21V 21/041; F21V 23/007; F21V 8/026; F21V 17/07

See application file for complete search history.

(56) References Cited

U.S. PATENT DOCUMENTS

| | | | | |
|---|---|---|---|---|
| 3,609,346 A * | 9/1971 | Lund | ......................... | F21S 8/02 362/364 |
| 6,234,645 B1 * | 5/2001 | Borner | ....................... | F21K 9/62 362/555 |

(Continued)

*Primary Examiner* — Ismael Negron
(74) *Attorney, Agent, or Firm* — Chun-Ming Shih; LANWAY IPR SERVICES

(57) ABSTRACT

The downlight apparatus includes a surface rim, a rotation bracket, a bowl housing and a light source. The surface rim has an rim edge and a lateral wall. The rotation bracket includes a bracket body and two arms. Each arm has an arm bottom and a arm top. The rotation bracket is attached to the lateral wall. The bowl housing has a bowl edge. The bowl edge defines a light opening. The arm tops of the two arms are attached to the bowl edge. The bowl housing is rotatable with a tilt angle with respect to the arm tops. The light source is mounted inside the bowl housing for emitting a light from the light opening.

18 Claims, 8 Drawing Sheets

(51) Int. Cl.
*F21V 29/70* (2015.01)
*F21Y 115/10* (2016.01)

(56) References Cited

U.S. PATENT DOCUMENTS

| | | | | |
|---|---|---|---|---|
| 6,402,112 | B1 * | 6/2002 | Thomas | F21V 21/30<br>248/318 |
| 7,434,967 | B2 * | 10/2008 | Dupre | F21S 8/026<br>362/366 |
| 7,484,866 | B1 * | 2/2009 | Buse | F21S 8/02<br>362/147 |
| 8,529,102 | B2 * | 9/2013 | Pickard | F21K 9/233<br>362/348 |
| 8,896,197 | B2 * | 11/2014 | Negley | F21K 9/233<br>362/230 |
| 9,239,149 | B2 * | 1/2016 | Vice | F21V 21/30 |
| 10,317,054 | B1 * | 6/2019 | Davis | F21S 8/026 |
| 11,098,883 | B2 * | 8/2021 | Zeng | F21V 14/02 |
| 11,536,423 | B2 * | 12/2022 | Chen | F21V 23/06 |
| 2010/0176730 | A1 * | 7/2010 | Lee | F21V 15/01<br>313/504 |
| 2017/0234517 | A1 * | 8/2017 | Highbridge | F21V 21/30<br>362/427 |

* cited by examiner

DOWNLIGHT APPARATUS WITH ANGULARLY ADJUSTABLE LIGHT SOURCE AND SUPPORT

RELATED APPLICATION

The present application is a continued application of U.S. patent application Ser. No. 17/463,808.

FIELD

The present invention is related to a downlight apparatus, and more particularly related to a downlight apparatus with a rotation structure.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

Downlight devices are widely used in various places. Users would like to modify configuration of downlight devices.

It is beneficial to design a downlight device with flexible configuration with robust structure.

SUMMARY

In some embodiments, a downlight apparatus includes a surface rim, a rotation bracket, a bowl housing and a light source.

The surface rim has an rim edge and a lateral wall.

The rotation bracket includes a bracket body and two arms.

Each arm has an arm bottom and a arm top.

The rotation bracket is attached to the lateral wall.

The bowl housing has a bowl edge.

The bowl edge defines a light opening.

The arm tops of the two arms are attached to the bowl edge.

The bowl housing is rotatable with a tilt angle with respect to the arm tops.

The light source is mounted inside the bowl housing for emitting a light from the light opening.

In some embodiments, the bracket body is a ring shape.

In some embodiments, the bracket body is rotatable along the lateral wall of the surface rim.

In some embodiments, the arm top has a bent part for fitting a connector of the bowl edge In some embodiments, the arm is approaching to the connector from the arm bottom to the arm top along an approaching line and the bent part has a bending angle with respect to the approaching line.

In some embodiments, the connector has a sleeve for preventing detachment of the arm top from the connector.

In some embodiments, the bowl edge has a rotation groove for the arm top to rotate within the rotation groove.

In some embodiments, the downlight apparatus may also include a fixing bar attached to the surface rim.

A pair of fixing units are attached to the fixing bar for fixing the downlight apparatus to an installation cavity.

In some embodiments, the connector has a protruding shaft to fit in a rotation hole of the arm top.

In some embodiments, the downlight apparatus may also include a driver box.

The driver box and the surface rim are fixed on opposite sides of the fixing bar.

In some embodiments, the blow housing has a socket for transmitting electricity to the light source.

In some embodiments, bowl housing has an outer part made of metal material for heat dissipation.

In some embodiments, where a reflective cup is disposed to surround the light source for guiding the light to the light opening.

In some embodiments, the downlight apparatus may also include a light passing cover.

A cover edge of the light passing cover is attached to the bowl edge of the bowl housing for pressing the reflective cup to the bowl housing.

In some embodiments, a lens is attached to the bowl housing for guiding the light to form a light pattern.

In some embodiments, the lens is movable with respect to the bowl housing for changing the light pattern.

In some embodiments, the bowl housing has a conductive path for guiding electricity from the arm top to the light source.

In some embodiments, the arms provides the light source with electricity connection and provides the bowl housing with structure connection.

The bowl housing is detachable from the arms to be replaced with another bowl housing.

In some embodiments, a lock unit is disposed on the arm top to prevent accident removal of the bowl housing.

In some embodiments, the light source includes multiple types of LED modules, a control circuit and a light source plate.

The control circuit is connected to a manual switch for changing a mixed light parameter of the multiple types of LED modules.

The LED modules and the control circuit are placed on the light source plate.

Electricity is supplied to control circuit and the LED modules from a driver.

The driver is placed outside the bowl housing.

DETAILED DESCRIPTION

Figure 4:
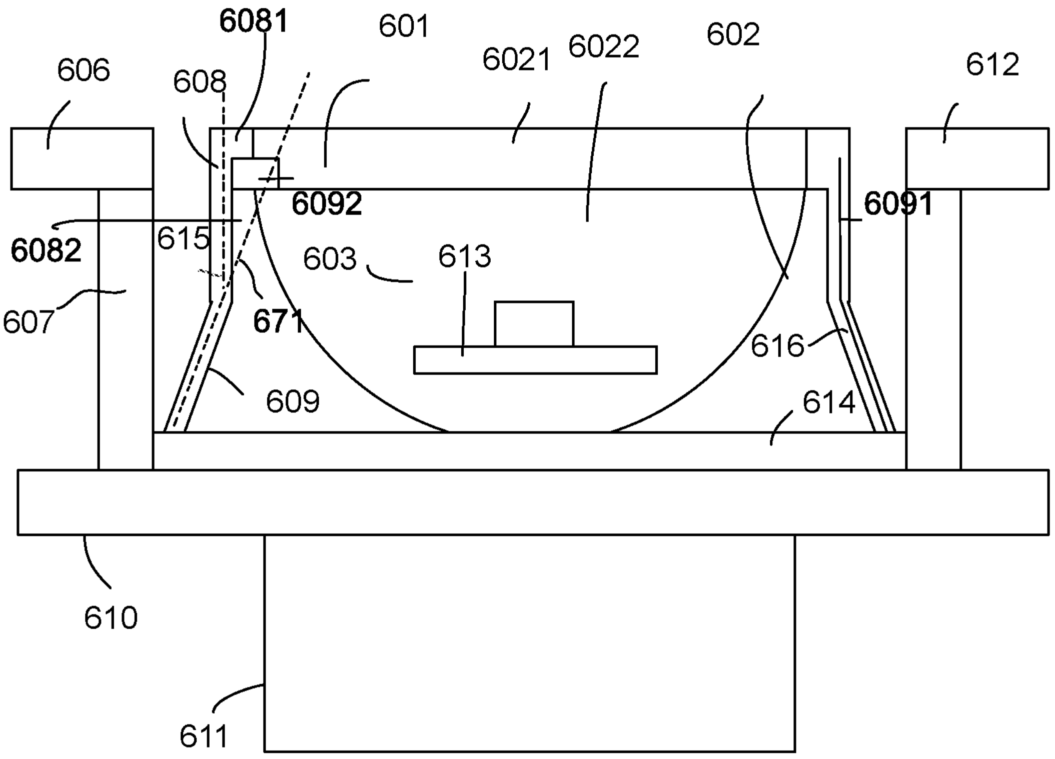
FIG. 4 illustrates a downlight embodiment.

In FIG. 4, a downlight apparatus includes a surface rim 612, a rotation bracket 615, a bowl housing 602 and a light source 613.

The surface rim 612 has an rim edge 606 and a lateral wall 607.

The rotation bracket 615 includes a bracket body 614 and two arms 616.

Each arm 616 has an arm bottom 609 and a arm top 608.

The rotation bracket 615 is attached to the lateral wall 607.

The bowl housing 602 has a bowl edge 6021.

The bowl edge 6021 defines a light opening 6022.

The arm tops 608 of the two arms 616 are attached to the bowl edge 6021.

The bowl housing 602 is rotatable with a tilt angle with respect to the arm tops 608.

Figure 5A:
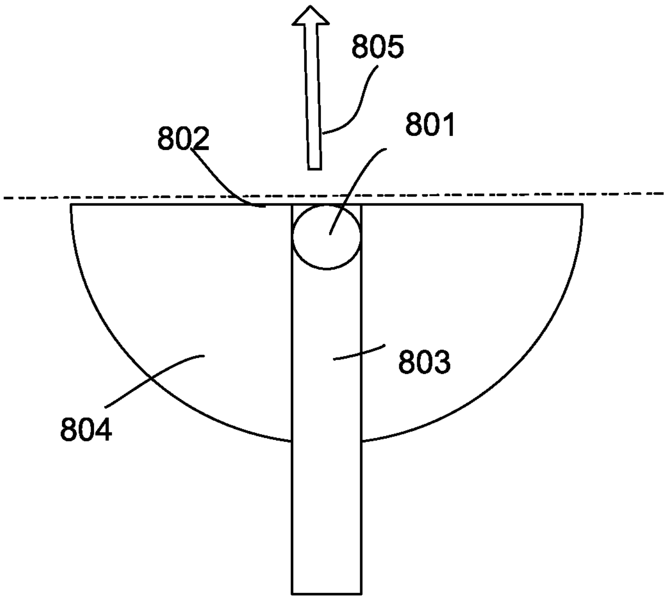
FIG. 5A and FIG. 5B show two operation states of an example.
Figure 5B:
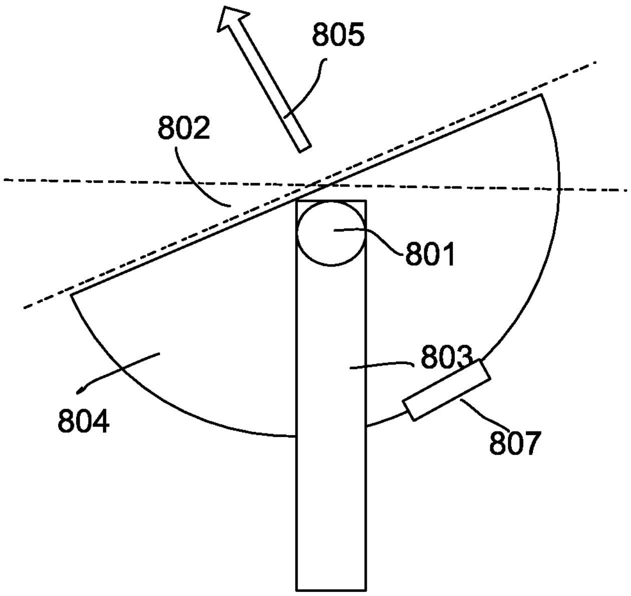

FIG. 5A and FIG. 5B shows an example for changing the tilt angle 802 by rotating the bowl housing 804 with respect to the arm 803 of the bracket along a rotation axis 801. By changing the tilt angle 802, a light direction 805 of a light emitted from the bowl housing 804 is adjusted.

In FIG. 4, the light source 613 is mounted inside the bowl housing 602 for emitting a light from the light opening 6022.

Figure 1:
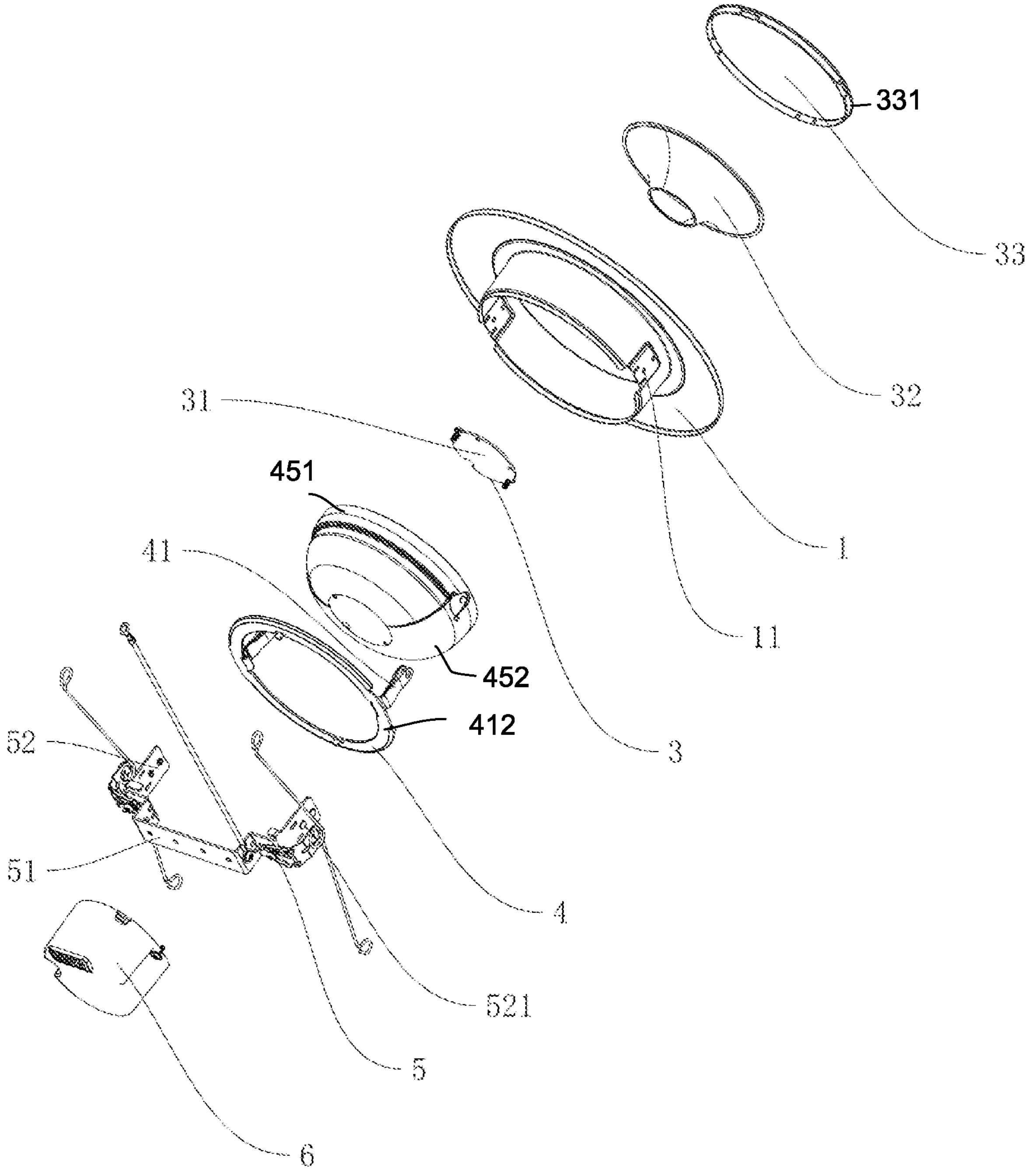
FIG. 1 illustrates an exploded view of a downlight embodiment.

In FIG. 1, the bracket body 412 of the rotation bracket 4 is a ring shape, as illustrated in FIG. 1. The rotation bracket 4 also has two arms 41 as mentioned above.

Figure 6:
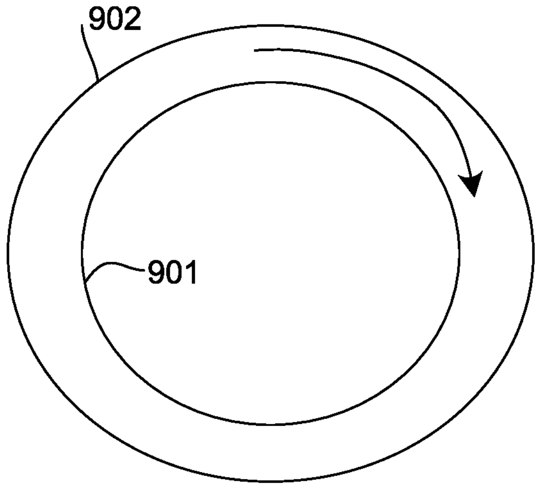
FIG. 6 shows a rotation of a rotation bracket.

FIG. 6 shows a top view of the example in FIG. 4. In some embodiments, the bracket body 901 is rotatable along the lateral wall 902 of the surface rim.

In FIG. 4, the arm top 608 has a bent part 6081 for fitting a connector of the bowl edge.

In FIG. 4, the arm is approaching to the connector from the arm bottom 609 to the arm top 608 along an approaching line 671 and the bent part 6081 has a bending angle 6082 with respect to the approaching line 671.

Figure 7:
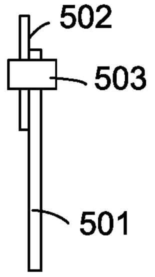
FIG. 7 shows a connector unit example.

In FIG. 7, the connector has a sleeve 503 for preventing detachment of the arm top 501 from the connector 502. For example, the sleeve 503 may be a short tube for inserting the arm top 501 so that the arm top 501 is kept in the sleeve 503, preventing sudden dropping of the bowl housing.

Figure 3:
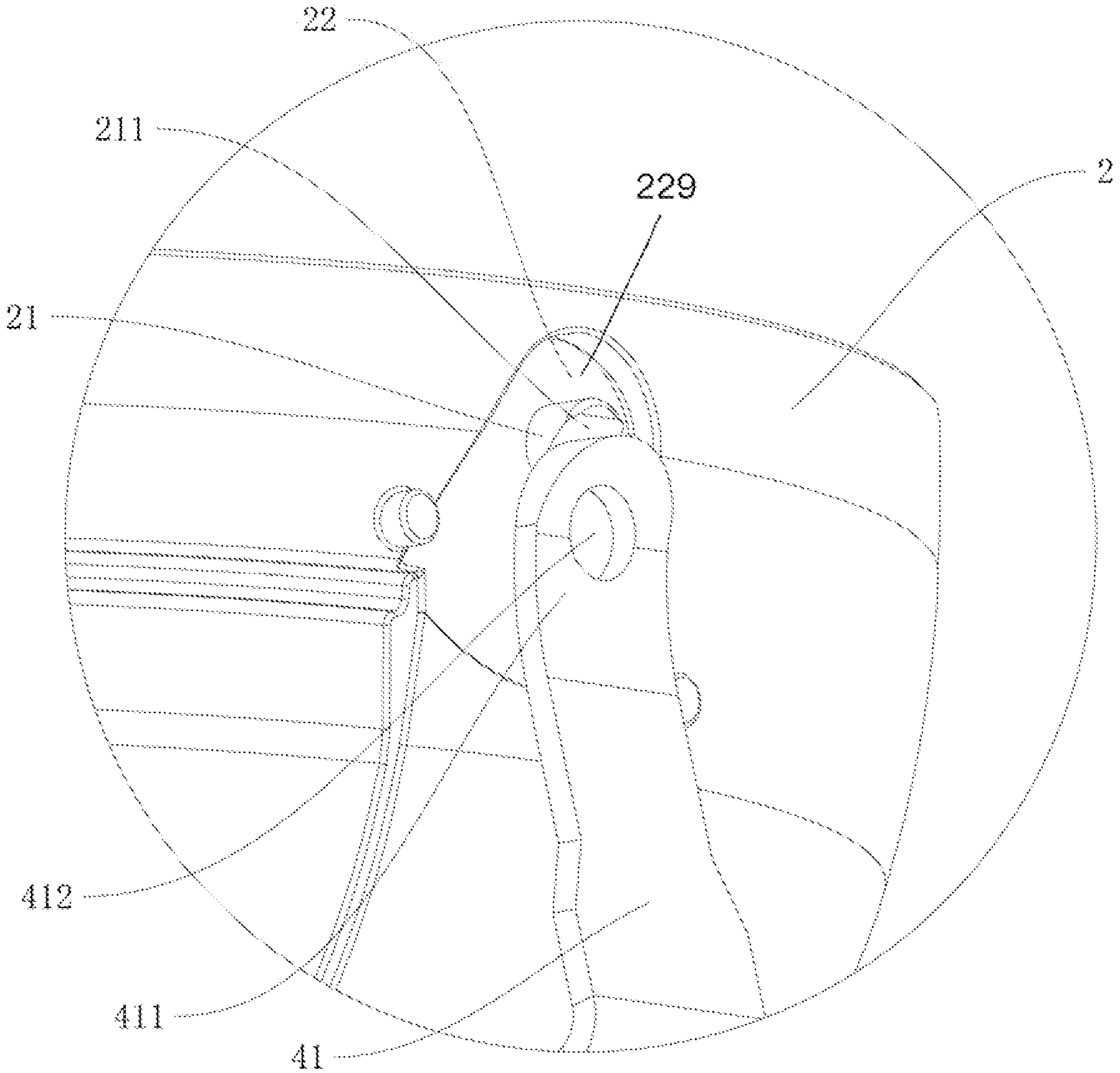
FIG. 3 illustrates a zoom-up view of a connection among components.

In FIG. 3, the bowl edge has a rotation groove 229 for the arm top 411 to rotate within the rotation groove 229.

In FIG. 1, the downlight apparatus may also include a fixing bar 5 attached to the surface rim 1.

A pair of fixing units 521 are attached to the fixing bar 5 for fixing the downlight apparatus to an installation cavity, e.g. a ceiling cavity or a junction box.

In FIG. 3, the connector has a protruding shaft 21 to fit in a rotation hole 412 of the arm top 411.

In FIG. 1, the downlight apparatus may also include a driver box 6.

The driver box 6 and the surface rim 1 are fixed on opposite sides of the fixing bar 5.

In FIG. 5B, the blow housing has a socket 807 for transmitting electricity to the light source.

In some embodiments, the bowl housing has an outer part made of metal material for heat dissipation.

In FIG. 1, where a reflective cup 32 is disposed to surround the light source for guiding the light to the light opening.

In FIG. 1, the downlight apparatus may also include a light passing cover 33.

A cover edge 331 of the light passing cover 33 is attached to the bowl edge 451 of the bowl housing for pressing the reflective cup 32 to the bowl housing 452.

Figure 8A:
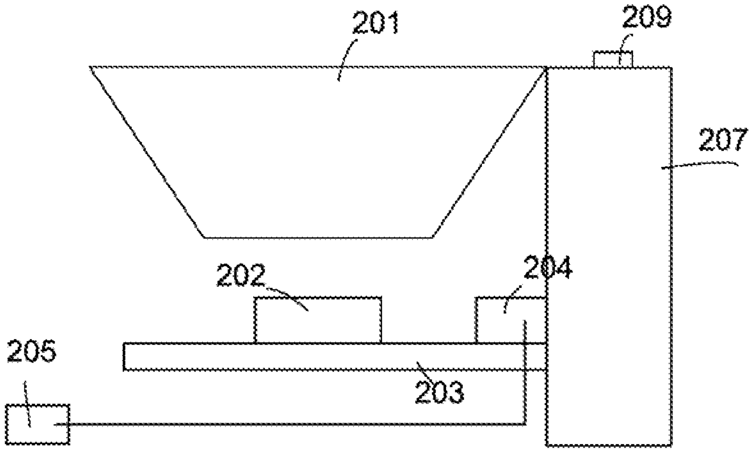
FIG. 8A and FIG. 8B show a downlight apparatus example in which a lens is movable with respect to the bowl housing.
Figure 8B:
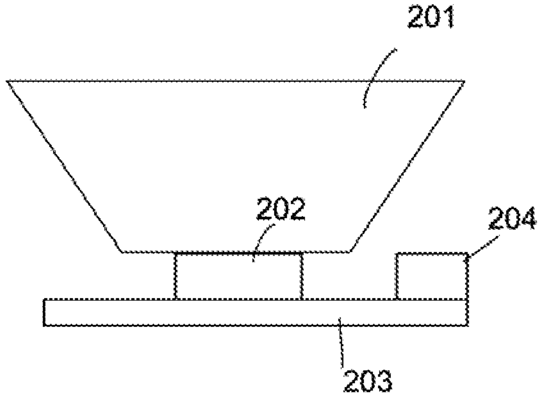

FIG. 8A and FIG. 8B show an example with lens 201 disposed facing to the light source 202.

The lens 201 is attached to the bowl housing for guiding the light to form a light pattern, e.g. a light beam with a first diameter.

The lens 201 is movable with respect to the bowl housing 207 for changing the light pattern by changing a relative distance between the lens 201 and the light source 202. For example, a screw groove is used for changing the relative distance between the lens 201 and the light source 202. When the relative distance is changed, the output light pattern, e.g. the diameter of the light pattern may be changed according to basic optical theory.

In FIG. 4, the bowl housing has a conductive path 6091 for guiding electricity from the arm top 609 to the light source 613.

In some embodiments, the arms provides the light source with electricity connection and provides the bowl housing with structure connection.

The bowl housing is detachable from the arms to be replaced with another bowl housing. When the electrical connection and the structure connection are both performed by the arms, it is easy and convenient for users to change a different bowl housing, e.g. to replace a broken module with a new module or to change a parameter of output light.

In FIG. 4, a lock unit 6092 is disposed on the arm top to prevent accident removal of the bowl housing. For example, a screw, a buckle or other locking structure may be used for keeping the arm top with the bowl housing.

In FIG. 8A, the light source includes multiple types of LED modules 202, a control circuit 204 and a light source plate 203.

The control circuit 204 is connected to a manual switch 209 for changing a mixed light parameter of the multiple types of LED modules 202.

The LED modules 202 and the control circuit 204 are placed on the light source plate 203.

Electricity is supplied to control circuit 204 and the LED modules 202 from a driver 205. For example, a common driver for converting an AC power to DC power is provided. The DC power is further used and dispatched by the control circuit 204. Compared with conventional art, the driver also handles control of the LED modules 202, the design adds a control circuit 204 corresponding to the LED modules 202. In such way, it is easy to change different setting by assembling a required light source plate mounted with LED modules and associated control circuit.

The driver 205 is placed outside the bowl housing, e.g. placed in a driver box outside the bowl housing.

Please refer to FIG. 1, which shows an exploded view of a downlight apparatus. In FIG. 1, the downlight apparatus has a light passing cover 33, a reflective cup 32, a surface rim 1, a bowl housing 452, a rotation bracket 4, a fixing bar 5 and a driver box 6.

The light source 3 is disposed inside the bowl housing 452. The fixing bar 51 has two lateral sub-arms 52.

Figure 2:
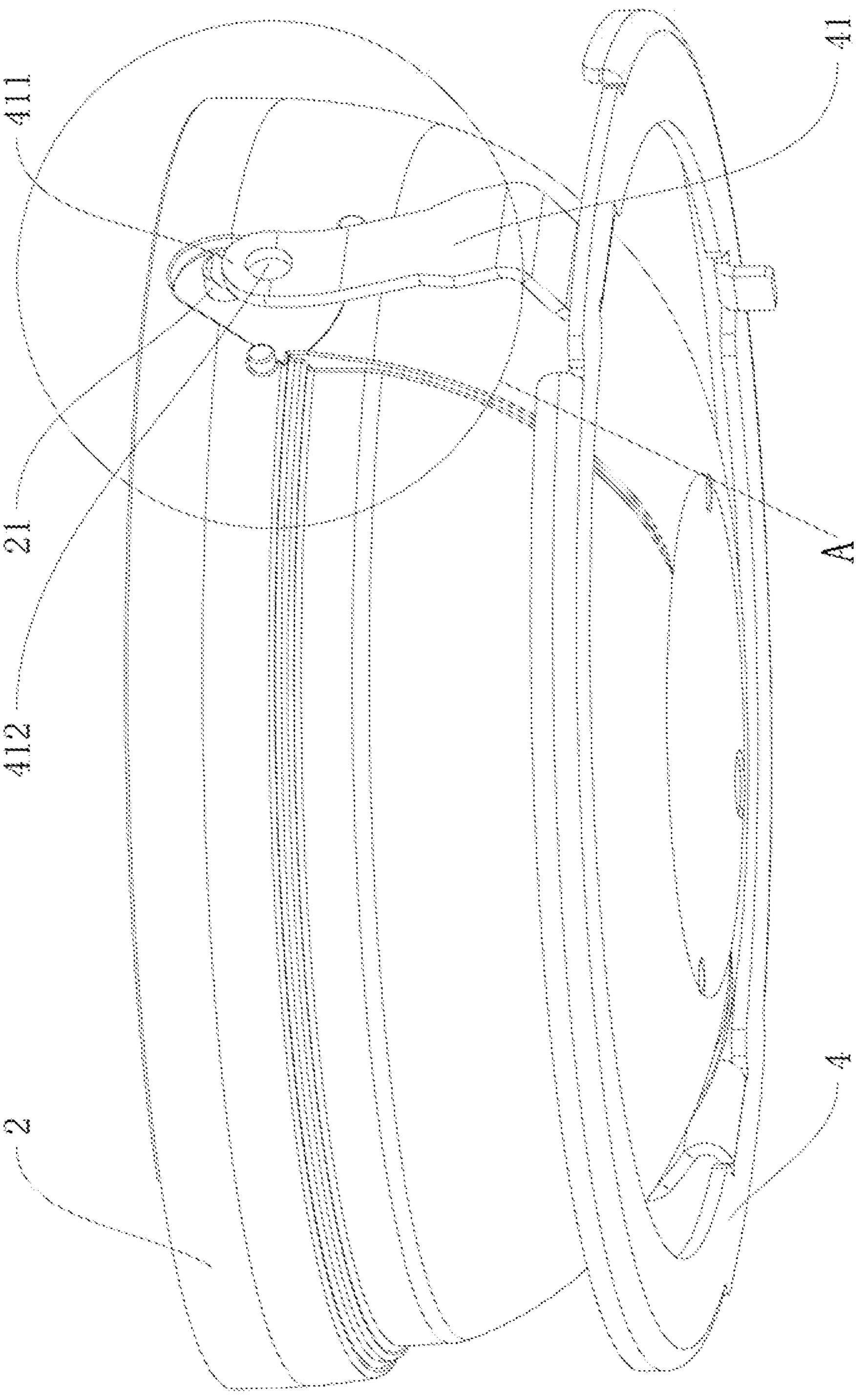
FIG. 2 illustrates a side view of the embodiment in FIG. 1.

FIG. 2 shows a side view of the example in FIG. 1.

In FIG. 2, the bowl housing 2 is attached to the arm 41 of the rotation bracket 4.

FIG. 3 shows a zoom-up view of the example in FIG. 3. In FIG. 3, in addition to the description mentioned above, there is a tilt surface 211 for easily guiding the connection of the arm 41 to the protruding shaft 21.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A downlight apparatus comprising:

a surface rim with a rim edge and a lateral wall;

a rotation bracket comprising a bracket body and two arms, wherein each arm has an arm bottom and an arm top, wherein the rotation bracket is attached to the lateral wall;

a bowl housing with a bowl edge, wherein the bowl edge defines a light opening, wherein the arm tops of the two arms are attached to the bowl edge, wherein the bowl housing is rotatable with a tilt angle with respect to the arm tops; and a light source mounted inside the bowl housing for emitting a light from the light opening, wherein the light source comprises multiple types of LED modules, a control circuit and a light source plate, wherein the control circuit is connected to a manual switch for changing a mixed light parameter of the multiple types of LED modules, wherein the LED modules and the control circuit are placed on the light source plate, wherein electricity is supplied to control circuit and the LED modules from a driver, wherein the driver is placed outside the bowl housing.

2. The downlight apparatus of claim 1, wherein the bracket body is a ring shape.

3. The downlight apparatus of claim 1, wherein the bracket body is rotatable along the lateral wall of the surface rim.

4. The downlight apparatus of claim 1, wherein the bowl housing has a socket for transmitting electricity to the light source.

5. The downlight apparatus of claim 1, wherein a lens is attached to the bowl housing for guiding the light to form a light pattern.

6. The downlight apparatus of claim 1, further comprising a fixing bar attached to the surface rim, wherein a pair of fixing units are attached to the fixing bar for fixing the downlight apparatus to an installation cavity.

7. The downlight apparatus of claim 6, the bowl housing further comprising a connector configured to couple the bowl housing to the rotation bracket, wherein the connector has a protruding shaft to fit in a rotation hole of the arm top.

8. The downlight apparatus of claim 6, further comprising a driver box, wherein the driver box and the surface rim are fixed on opposite sides of the fixing bar.

9. The downlight apparatus of claim 1, wherein the bowl housing has a conductive path for guiding electricity from the arm top to the light source.

10. The downlight apparatus of claim 9, wherein the arms provide the light source with electricity connection and provides the bowl housing with structure connection, wherein the bowl housing is detachable from the arms to be replaced with another bowl housing.

11. The downlight apparatus of claim 9, wherein a lock unit is disposed on the arm top to prevent accident removal of the bowl housing.

12. The downlight apparatus of claim 1, wherein the bowl housing has an outer part made of metal material for heat dissipation.

13. The downlight apparatus of claim 12, where a reflective cup is disposed to surround the light source for guiding the light to the light opening.

14. The downlight apparatus of claim 13, further comprising a light passing cover, wherein a cover edge of the light passing cover is attached to the bowl edge of the bowl housing for pressing the reflective cup to the bowl housing.

15. The downlight apparatus of claim 1, wherein the arm top has a bent part for fitting a connector of the bowl edge.

16. The downlight apparatus of claim 15, wherein the arm is approaching to the connector from the arm bottom to the arm top along an approaching line and the bent part has a bending angle with respect to the approaching line.

17. The downlight apparatus of claim 15, wherein the connector has a sleeve for preventing detachment of the arm top from the connector.

18. The downlight apparatus of claim 17, wherein the bowl edge has a rotation groove for the arm top to rotate within the rotation groove.

* * * * *